No. 724,977. PATENTED APR. 7, 1903.
R. WEIR.
CLOTHES CABINET.
APPLICATION FILED SEPT. 8, 1902.
NO MODEL. 2 SHEETS—SHEET 1.

Witnesses.
Lloyd Blackmore
R. J. Trotter

Inventor.
Roderick Weir
by Fetherstonhaugh & Co.
Atty's.

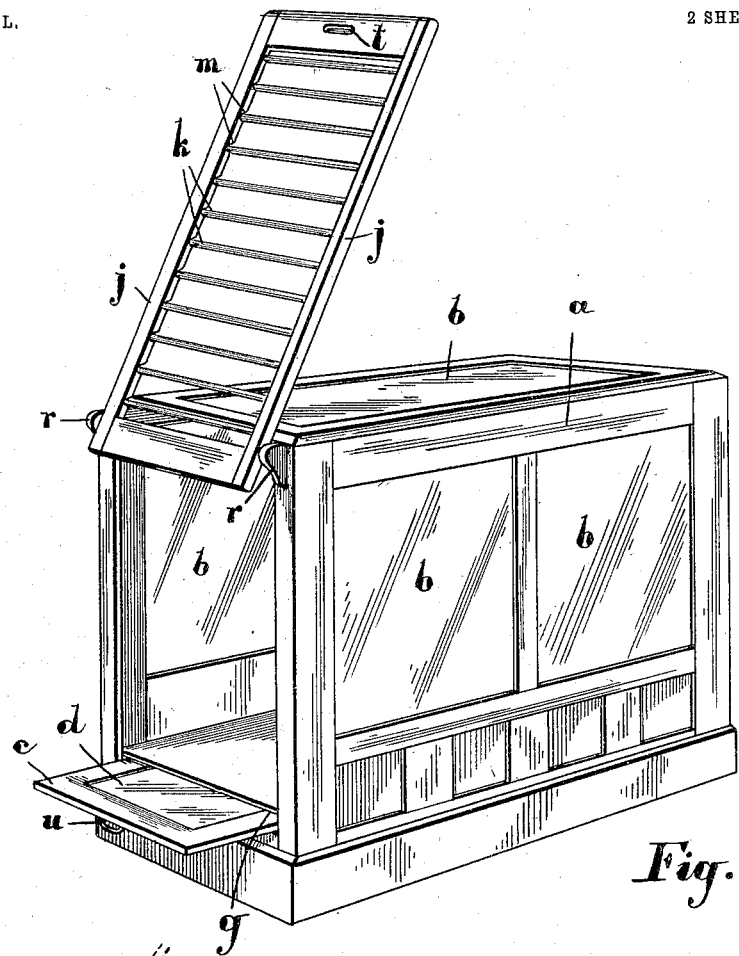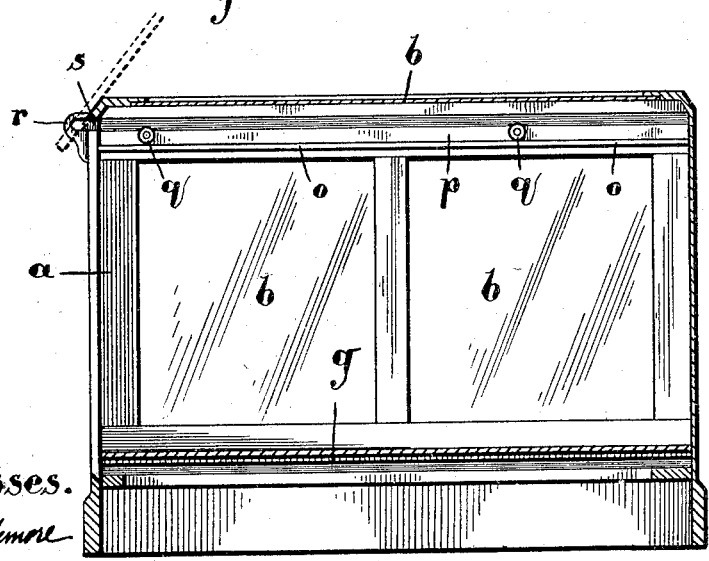

UNITED STATES PATENT OFFICE.

RODERICK WEIR, OF WINNIPEG, CANADA, ASSIGNOR OF ONE-HALF TO EUGENE RICHARD, OF WINNIPEG, CANADA.

CLOTHES-CABINET.

SPECIFICATION forming part of Letters Patent No. 724,977, dated April 7, 1903.

Application filed September 8, 1902. Serial No. 122,584. (No model.)

*To all whom it may concern:*

Be it known that I, RODERICK WEIR, a subject of the King of Great Britain, residing at Winnipeg, in the county of Selkirk, Province of Manitoba, Canada, have invented certain new and useful Improvements in Clothes-Cabinets, of which the following is a specification.

My invention relates to improvements in clothes-cabinets; and the object of the invention is to devise a display-cabinet which shall obviate the necessity of handling large numbers of pairs of trousers or other garments when desiring to show the various patterns and makes and whereby the garments, though exhibited to view, will be kept in good shape and dust-proof; and it consists, essentially, of a casing preferably having large panels of glass in the sides and top thereof, and a disappearing door forming one end thereof, and a rack designed to slide longitudinally of the casing in the interior thereof and having a plurality of removable rails, the various parts being constructed in detail, as hereinafter more particularly described.

Figure 1:
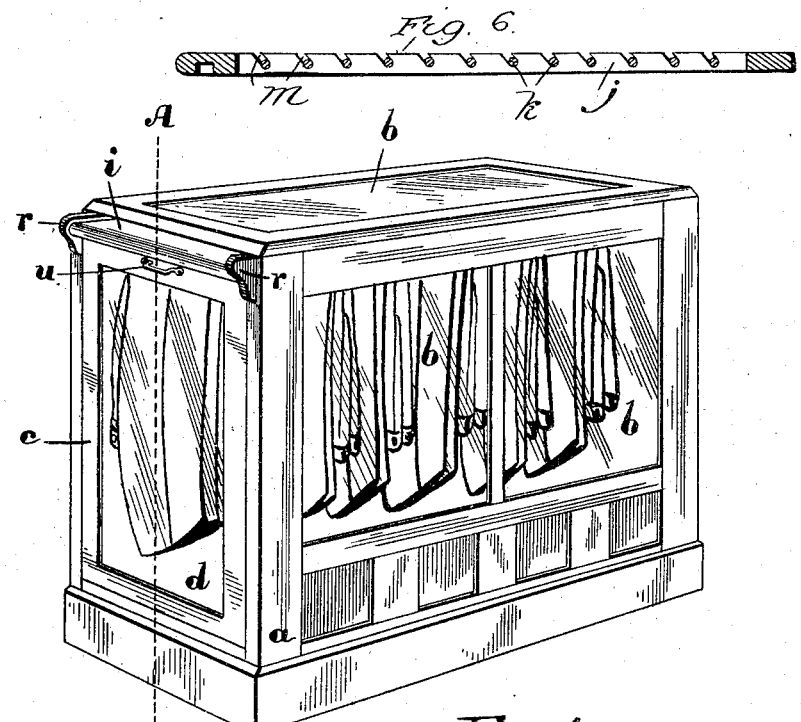
Figure 3:
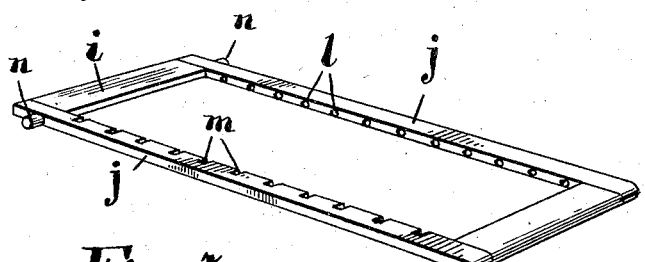
Figure 4:
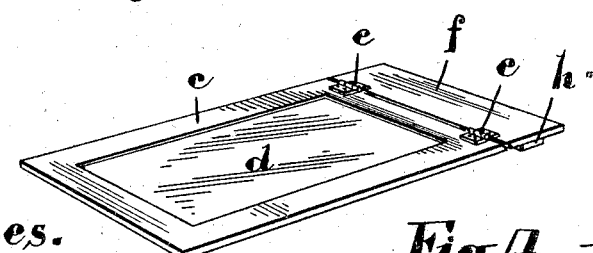

Figure 1 is a perspective view of my cabinet in its closed position. Fig. 2 is a perspective view of my cabinet open and with the rack thrown back. Fig. 3 is a perspective view of the rack. Fig. 4 is a detail of the disappearing door. Fig. 5 is a longitudinal sectional view through A B in Fig. 1, omitting the rack and door. Fig. 6 is a detail view.

Like letters of reference indicate corresponding parts in each figure.

$a$ is the casing, having the glass panels $b$ in the sides and top thereof designed to show the interior of the cabinet from the outside.

$c$ is the door, having a glass panel $d$ for the same purpose as the aforesaid glass panels.

The door $c$ is hinged at $e$ to the board $f$, which slides longitudinally of the cabinet in the space $g$. $h$ is a stop attached to the board $f$.

$u$ is a handle designed to pull the door down to its lower position to slide into the space $g$.

$i$ is a rack having an open outside frame $j$ and the removable rails $k$, inserted in orifices $l$ in one side of the frame and extending across into the slanting slots $m$ in the other side. The said slots $m$ slant toward the rear of the cabinet.

$n$ represents pins extending outwardly from the sides of the frame $j$ in proximity to one end thereof.

$o$ represents brackets extending the full length of the cabinet in the interior and projecting from the sides near the top thereof.

$p$ represents grooves running lengthwise in the said brackets $o$.

$q$ represents rollers journaled in the grooves $p$ and projecting slightly thereabove. The rack $i$ slides back and forth on the rollers $q$.

$r$ represents brackets on the front of the cabinet-frame adjacent to the top at each side and having slots $s$, into which the pins $n$ are designed to slide when the rack is in its extreme outward position, retarding its further progress.

$t$ is a recess in the under side of the rack-frame $j$, designed to serve as a hand-grip.

Having described the various parts involved in my invention, I shall now more particularly explain the operation thereof.

The cabinet is preferably put into a prominent position in a clothing-store, where a good light will show plainly the interior of the said cabinet. The rack $i$ is pulled out and on each rail thereof is put a pair of trousers, the legs hanging down on one side of the said rail and the waist on the other. It is desirable to put a number of different patterns of trousers in the same cabinet. The rack is then rolled in over the rollers $q$, and it may be here said that when the rack has been pulled out to its full extent the ends of the open frame $j$ abut the upper inside surface of the cabinet-frame and keep the said rack in a horizontal position. Now when the rack is pushed into place it rests on the brackets $o$, the outer ends of the open frame $j$ extending out beyond the cabinet-frame and substantially flush with the brackets $r$. This allows for the door to fold up under the outer end of the rack when the latter is in its inner position. The customer may look through the glass top of the cabinet and decide which of the numerous pairs of trousers he would like to examine more closely or in which cabinet he would like to give the trousers a closer inspection—that is, the customer can readily determine by a hurried glance through all the different patterns as to which he favors. This undoubtedly tends to lessen the amount of handling and to show off the goods to advantage. When it is desired to examine the texture of any pair or pairs of trousers, the door is pulled down and slid into the space g, as before explained, and the rack is then pulled out until it is stopped by the projecting pins n sliding into the slots s in the brackets r. The rack now may be turned up and back against the top of the frame of the casing, the brackets r extending out sufficiently to allow the rack when in its upper position to slightly fall backward in order to let it stay in the upper position until manually brought down. The legs of the trousers are all now hanging one over the other, and without any trouble the trousers wanted may be found and, if necessary, can be removed by simply taking the rail holding the pair of trousers out of the rack and show them to the customer in the usual way.

It will be seen in the foregoing that an immensity of handling is avoided, and also the goods are shown off to very much more advantage than piled one on top of the other, as is usual, besides the goods are kept absolutely dust-proof, which is undoubtedly a very salient feature in this device.

What I claim as my invention is—

1. In a clothes-cabinet, the combination with the casing having an open side having an unobstructed interior and a movable panel for said open side, of a rack having a plurality of rails thereacross, a plurality of brackets designed to support the rack in the upper part of the interior of the casing, and suitable rollers journaled in said brackets, as and for the purpose specified.

2. In a clothes-cabinet, the combination with the casing having an open end and a disappearing panel therefor, of a slidable rack having a plurality of removable rails thereacross, a plurality of brackets having rollers journaled therein, designed to support the rack in the interior of the casing, as and for the purpose specified.

3. In a clothes-cabinet, the combination with the casing having transparent sides and top and a raised flooring in the interior, and provided with a disappearing panel designed to close the said open end, a slidable rack having outwardly-extending pins from its sides toward its inner end, a plurality of brackets having rollers journaled therein, and grooved extensions beyond the casing at its front end, designed to receive the aforesaid pins of the rack in its extreme outward position, as and for the purpose specified.

4. In a clothes-cabinet, in combination, a casing having an open end beveled at the top thereof, and a disappearing panel designed to close the said open end, an open-frame rack provided with orifices in one of its longitudinal inside edges, and slanting slots in the opposite edge, a plurality of rails designed to be inserted in said orifices and edge, an outwardly-extending pin from each of the outer edges of the said open frame toward its inner end, a plurality of brackets designed to support the rack in the interior of the casing, and a pair of grooved brackets extending beyond the casing at its front end in alinement with the aforesaid brackets, as and for the purpose specified.

5. In a clothes-cabinet, the combination with the casing having an open end and a suitable door therefor, of a slidable open-frame rack having a plurality of orifices in one of its inner longitudinal edges, and a plurality of slanting slots in the opposite edge, a plurality of rails designed to be inserted in the said orifices and slots, and suitable supports in the interior of the casing for the rack, as and for the purpose specified.

6. In a clothes-cabinet, the combination with the casing having an open end and a suitable door therefor, of an open-frame rack, suitable supports in the interior of the casing for the rack, and a plurality of rails extending across the central open space of the frame, as and for the purpose specified.

7. In a clothes-cabinet, the combination with the casing having an open end and a suitable door therefor, of a slidable open-frame rack, a plurality of removable rails thereacross, an outwardly-extending pin toward one end of the rack from each of the longitudinal edges, a plurality of brackets supporting the said rack-frame and having grooved extensions beyond the outer casing, as and for the purpose specified.

Signed at the city of Winnipeg, in the county of Selkirk, in the Province of Manitoba, Canada, this 25th day of August, 1902.

RODERICK WEIR.

Witnesses:
JAMES S. GREIG,
ERNEST STIGANT.